(12) United States Patent
Sharma et al.

(10) Patent No.: US 9,245,135 B2
(45) Date of Patent: Jan. 26, 2016

(54) CDR FILTERING FOR VIRTUAL OPERATORS

(71) Applicants: Ranjan Sharma, New Albany, OH (US); Helmut Raether, Shorewood, IL (US); Yigang Cai, Naperville, IL (US)

(72) Inventors: Ranjan Sharma, New Albany, OH (US); Helmut Raether, Shorewood, IL (US); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 185 days.

(21) Appl. No.: 13/848,919

(22) Filed: Mar. 22, 2013

(65) Prior Publication Data

US 2014/0289803 A1 Sep. 25, 2014

(51) Int. Cl.
*G06F 21/00* (2013.01)
*G06F 21/60* (2013.01)
*G06F 21/62* (2013.01)
*H04L 29/06* (2006.01)

(52) U.S. Cl.
CPC .......... *G06F 21/606* (2013.01); *G06F 21/6218* (2013.01); *G06F 21/6227* (2013.01); *G06F 2221/2141* (2013.01); *H04L 63/101* (2013.01)

(58) Field of Classification Search
USPC .......................................................... 726/4
See application file for complete search history.

(56) References Cited

U.S. PATENT DOCUMENTS

2007/0201361 A1* 8/2007 Kumar et al. ................. 370/230
2007/0203880 A1* 8/2007 Kumar et al. .................... 707/1
2014/0129420 A1* 5/2014 Howe .............................. 705/38

OTHER PUBLICATIONS

Chang et al, Challenges to Next Generation Services in IP Multimedia Subsystem, Journal of Information Processing Systems, vol. 6, No. 2, Jun. 2010.*
Digital cellular telecommunications system (Phase 2+); Universal Mobile Telecommunications System (UMTS); LTE; Telecommunication management; Charging management; Charging Data Record (CDR) file format and transfer (3GPP TS 32.297 version 8.2.0 Release 8), ETSI TS 132 297 V8.2.0 (Jul. 2009), 650 Route des Lucioles F-06921 Sophia Antipolis Cedex—France.

* cited by examiner

*Primary Examiner* — Izunna Okeke
*Assistant Examiner* — Ali Shayanfar
(74) *Attorney, Agent, or Firm* — Duft Bornsen & Fettig, LLP (57) ABSTRACT

Systems and methods that filter Charging Data Records (CDRs) before sending the CDRs to a virtual operator, such as a Network Unaffiliated Virtual Operator (NUVO). In one embodiment, a communication network provides services to subscribers of a virtual operator. The communication network includes a reporting entity comprising a CDR database configured to store CDRs for subscribers of the virtual operator. The reporting entity also includes a filtering node configured to filter the CDRs to remove fields that are not authorized to be shared with the virtual operator, and to report the filtered CDRs to the virtual operator.

14 Claims, 5 Drawing Sheets

IMSCorrelatedRecord — Template

| | 1 | 2 | 3 | 4 | 5 | 6 | 7 | 8 | 9 |
|---|---|---|---|---|---|---|---|---|---|
| recordType | x | x | x | x | x | x | x | x | x |
| sIP-Method | | x | x | x | x | x | x | x | x |
| role-of-Node | | | | | | | | | x |
| list-Of-Node-Information | | | | | | | | | x |
| sessionId | | | x | x | x | x | x | x | x |
| list-Of-Calling-Party-Address | x | x | x | x | x | x | x | x | x |
| called-Party-Address | x | x | x | x | x | x | x | x | x |
| privateUserID | | | | | x | x | x | x | x |
| serviceRequestTimeStamp | | | | | | x | x | x | x |
| serviceDeliveryStartTimeStamp | x | x | x | x | x | x | x | x | x |
| serviceDeliveryEndTimeStamp | x | x | x | x | x | x | x | x | x |
| recordOpeningTime | | | | | x | x | x | x | x |
| recordClosureTime | | | | | x | x | x | x | x |
| interOperatorIdentifiers | | | | | | x | x | x | x |
| localRecordSequenceNumber | | | | | | | | | x |
| recordSequenceNumber | | | x | x | x | x | x | x | x |
| iMS-Charging-Identifier | | | | | | | | | x |
| list-Of-SDP-Media-Components | | | | | x | x | x | x | x |
| gGSNaddress | | | | | x | x | x | x | x |
| list-Of-Message-Bodies | | | | | | | x | x | x |
| recordExtensions | | | | | | | | x | x |
| expiresInformation | | | | | | | | x | x |
| list-Of-Associated-URI | | | | | | | | | x |
| Event | | | | | | | | | x |
| accessNetworkInformation | | | | | | | | | x |
| serviceContextID | | | | | x | x | x | x | x |
| list-of-subscription-ID | | | | | | | x | x | x |
| list-Of-Early-SDP-Media-Components | | | | | x | x | x | x | x |
| iMSCommunicationServiceIdentifier | | | | | | | x | x | x |
| numberPortabilityRouting | | | | | | | x | x | x |
| carrierSelectRouting | | | | | | | | x | x |
| serviceSpecificInfo | | | | x | x | x | x | x | x |
| applicationServersInformation | | | | | | | | x | x |
| requested-Party-Address | | | | x | x | x | x | x | x |
| list-Of-Called-Asserted-Identity | | | | | x | x | x | x | x |
| alternateChargedPartyAddress | | | | | x | x | x | x | x |

CDR FILTERING FOR VIRTUAL OPERATORS

FIELD OF THE INVENTION

The invention is related to the field of communication systems and, in particular, to charging for sessions of a virtual operator, such as a Network Unaffiliated Virtual Operator (NUVO).

BACKGROUND

Network operators (also referred to as service providers) provide voice and data services to end users that subscribe to these services. Examples of voice services are voice calls, call forwarding, call waiting, etc. Examples of data services are streaming audio, streaming video, Voice over Internet Protocol (VoIP), online gaming, IP-TV, etc. A network operator owns and controls the elements of a network which are used to provide the services to the end users, such as switches, gateways, servers, base stations, charging entities, billing entities, etc. Some commonly known network operators in the United States are Verizon Wireless and AT&T.

There is a new breed of service provider that offers services to end users, but does not own any infrastructure to provide the services. These types of service providers are referred to as "virtual operators" or "virtual network operators". One type of virtual operator is referred to as a Network Unaffiliated Virtual Operator (NUVO). Because a virtual operator does not have its own infrastructure for providing telecommunication services, the virtual operator enters into an agreement with one or more network operators that have an infrastructure to purchase bandwidth (e.g., data bandwidth, voice minutes, SMS, MMS, etc.). The virtual operator then resells services to consumers by offering its own service subscriptions, which may be offered at a discount because the virtual operator typically purchases the bandwidth from the network operators in bulk. Because the subscription of a consumer is through the virtual operator, the consumer may not know what network operator is actually providing a service at any given time. The subscriptions, billing, customer service, etc., is all handled by the virtual operator.

After a network operator provides services for subscribers of a virtual operator, the network operator aggregates usage information for the subscribers of the virtual operator at the end of a billing cycle, and sends the usage information as a batch file to the virtual operator. The aggregate usage information is high-level information generally indicating resource usage by the subscribers of the virtual operator. For example, the aggregate usage information may indicate the amount of minutes used, the number of short messages sent, etc., during the billing cycle. However, a virtual operator may desire more detailed charging information from the network operator regarding its subscribers.

SUMMARY

Embodiments described herein provide filtered Charging Data Records (CDR) from a network operator to a virtual operator regarding services accessed by the subscribers of the virtual operator. Because aggregate usage information from a network operator may not be sufficient for a virtual operator to address billing issues for its subscribers, virtual operators may desire more detailed charging information from the network operators. When a subscriber of the virtual network receives services from network elements of a network operator, the network elements generate CDRs that describe chargeable events for the services. The CDRs include very detailed information regarding the chargeable events. However, a network operator may be reluctant to simply share CDRs generated in its network with a virtual operator, as there may be information in the CDRs that the network operators want to keep private. In the following embodiments, a network operator is configured to provide CDRs to a virtual operator that are filtered to remove fields that are not authorized to be shared with the virtual operator. Therefore, the virtual operator is able to receive more detailed charging information from CDRs regarding the usage of its subscribers, while the network operator is able to conceal certain CDR information from the virtual operators.

One embodiment comprises a reporting entity of a communication network that provides services to subscribers of a virtual operator. The reporting entity includes a Charging Data Record (CDR) database configured to store CDRs for the subscribers of the virtual operator. The reporting entity further includes a filtering node configured to filter the CDRs to remove fields that are not authorized to be shared with the virtual operator, and to report the filtered CDRs to the virtual operator.

In another embodiment, the reporting entity further comprises a permissions database configured to store a plurality of data entries. Each of the data entries in the permission database includes a permission level, and a template indicating CDR fields that are authorized to be shared at the permission level.

In another embodiment, the filtering node is configured to query the permissions database to retrieve one of the templates corresponding with the permission level of the virtual operator, and to filter the CDRs based on the template to remove the fields that are not authorized to be shared with the virtual operator.

In another embodiment, the permissions database is configured to store, in each of the data entries, an indicator of CDR types that are authorized to be shared.

In another embodiment, the filtering node is configured to filter the CDRs to remove the CDR types that are not authorized to be shared with the virtual operator.

In another embodiment, the filtering node is configured to push the filtered CDRs to the virtual operator at the end of a billing cycle.

In another embodiment, the filtering node is configured to receive a fetch request from the virtual operator, and to report the filtered CDRs to the virtual operator in response to the fetch request.

In another embodiment, the virtual operator comprises a Network Unaffiliated Virtual Operator (NUVO).

Another embodiment comprises a method of sharing CDR information with a virtual operator. The method includes storing CDRs for services provided through a communication network to subscribers of the virtual operator. The method further includes filtering the CDRs to remove fields that are not authorized to be shared with the virtual operator, and reporting the filtered CDRs to the virtual operator.

Another embodiment comprises a non-transitory computer readable medium that stores program instructions for a reporting entity of a communication network that provides services to subscribers of a virtual operator. The program instructions, when executed by a computer system, instruct the computer system to store CDRs for the subscribers of the virtual operator, filter the CDRs to remove fields that are not authorized to be shared with the virtual operator, and report the filtered CDRs to the virtual operator.

Other exemplary embodiments may be described below.

DESCRIPTION OF THE DRAWINGS

Some embodiments are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
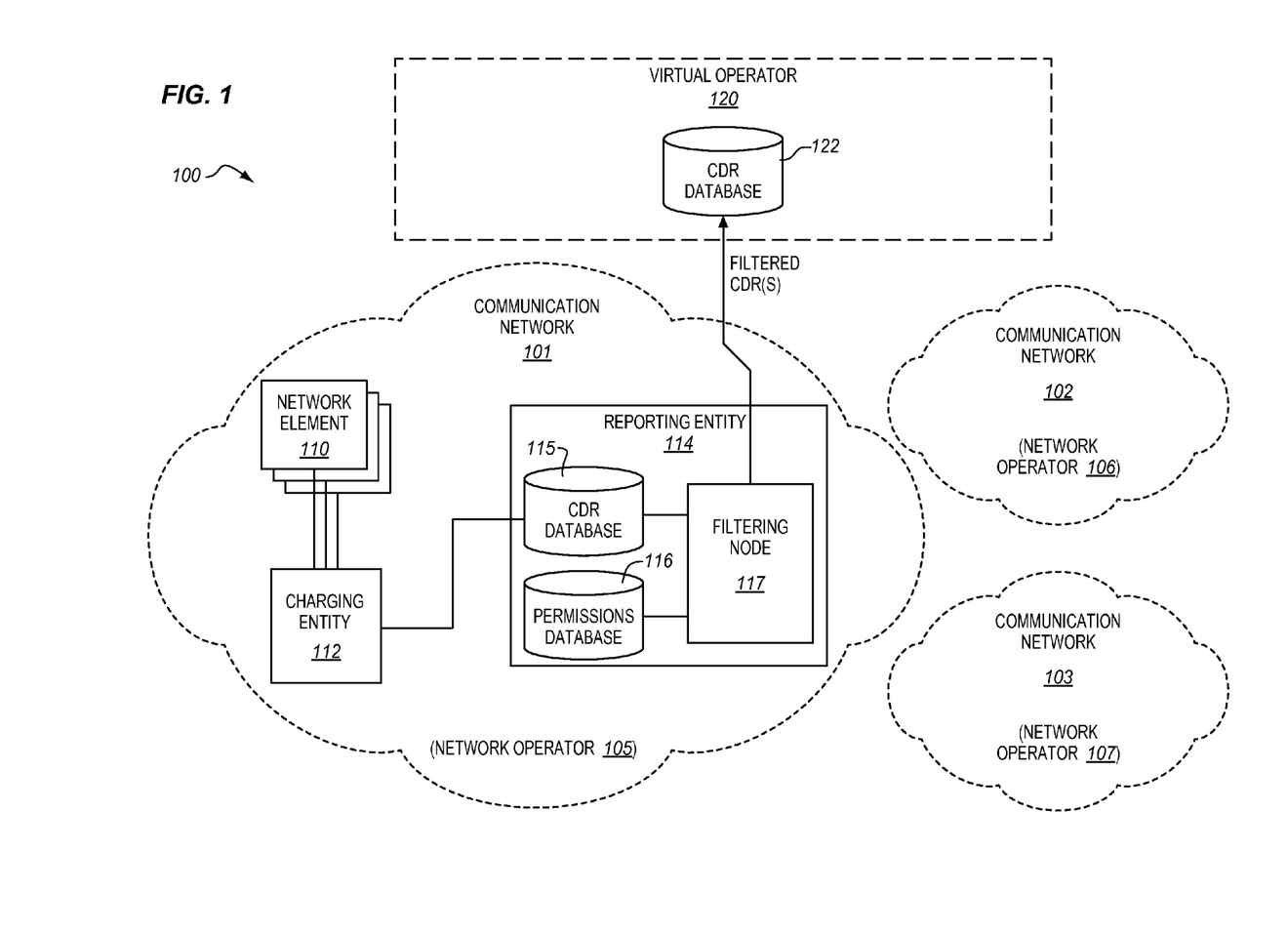
FIG. 1 illustrates a communication system in an exemplary embodiment.

FIG. 1 illustrates a communication system 100 in an exemplary embodiment. Communication system 100 includes a plurality of communication networks 101-103 for providing services to end users. For example, communication networks 101-103 may provide voice services, SMS, MMS, data services, etc. Communication networks 101-103 may be mobile networks, fixed-line networks, broadband data networks, or any other type of network. Communication networks 101-103 are owned/controlled by network operators 105-107, respectively.

Communication system 100 also includes a virtual operator 120 that sits on top of communication networks 101-103. Virtual operator 120 is a type of service provider that offers services to end users, but does not own any infrastructure to provide the services. Some examples of virtual operator 120 are a Network Unaffiliated Virtual Operator (NUVO) and a Mobile Virtual Network Operator (MVNO). Virtual operator 120 has entered into an agreement with one or more of network operators 105-107 to purchase resources on their networks 101-103. Virtual operator 120 then offers subscriptions to consumers for these services.

Communication network 101 includes a plurality of network elements 110 and a charging entity 112 (communication networks 102-103 may have similar architectures). Network elements 110 represent nodes or resources in network 101 that provide services for the subscribers of virtual operator 120, along with services for other subscribers. For example, network elements 110 may support a voice call, handle SMS or MMS messages, provide a data session, etc. When network elements 110 provide the services, they will report charging events for the services to charging entity 112. Charging entity 112 is a node of network 101 that assembles charging events for network elements 110, and generates Charging Data Records (CDR) for network elements 110 based on the charging events. For example, charging entity 112 may comprise an Offline Charging System (OFCS), an Online Charging System (OCS), etc. A CDR is a formatted collection of information about a chargeable event (e.g., time of call set-up, duration of the call, amount of data transferred, etc.) for use in billing and accounting (as defined in 3GPP TS 32.298). A CDR has fields that are defined for information about the chargeable event, and charging entity 112 populates the field of the CDR with information about the chargeable event.

In a traditional communication network, usage information for subscribers of virtual operator 120 will be reported to virtual operator 120 at the end of a billing cycle. Thus, a traditional communication network will send a batch file to virtual operator 120 indicating the amount of minutes used for voice calls, the number of SMS/MMS messages sent, the amount of data consumed, etc., during the billing cycle. However, this high-level usage information may not be sufficient for virtual operator 120 to address billing issues. At the same time, network operators (e.g., network operators 105-107) may be reluctant to share detailed charging information with virtual operator 120 or other virtual operators. CDRs often contain information besides normal charging information, and virtual operators could use information from CDRs analyze the operations of communication networks, such as subscriber counts, usage/calling patterns, equipment health and load index, Quality of Service (QoS), jitter/buffer statistics, bit error rate (BER), response time for individual network elements, etc. Network operators may not want virtual operators to have this type of detailed information about their networks that could be deduced from the information contained in CDRs.

In the following embodiments, a reporting entity 114 is defined in communication network 101 to report charging information to virtual operator 120 (and other virtual operators not shown) for the subscribers of virtual operator 120. Reporting entity 114 is able to determine the permission level of a particular virtual operator 120, and determine how much CDR information is authorized to be reported to the virtual operator 120 based on their permission level. Therefore, virtual operator 120 may be authorized to receive more detailed charging information regarding the usage of its subscribers, while the network operators are able to conceal certain charging information from the virtual operators.

In this embodiment, reporting entity 114 includes a CDR database 115, a permissions database 116, and a filtering node 117. Although shown as a separate element in FIG. 1, reporting entity 114 may be part of an OFCS, an OCS, a mediation system, etc. CDR database 115 is a storage element that stores CDRs generated by charging entity 112 for subscribers of virtual operator 120. Permissions database 116 is a storage element that stores criteria or rules for determining what charging information is authorized to be reported to virtual operator 120 or other virtual operators not shown. Filtering node 117 is an element that filters data from CDRs that is not authorized to be reported to virtual operator 120, and reports the filtered CDRs to virtual operator 120. Thus, filtering node 117 controls what CDR information is shared with virtual operator 120.

Figure 2:
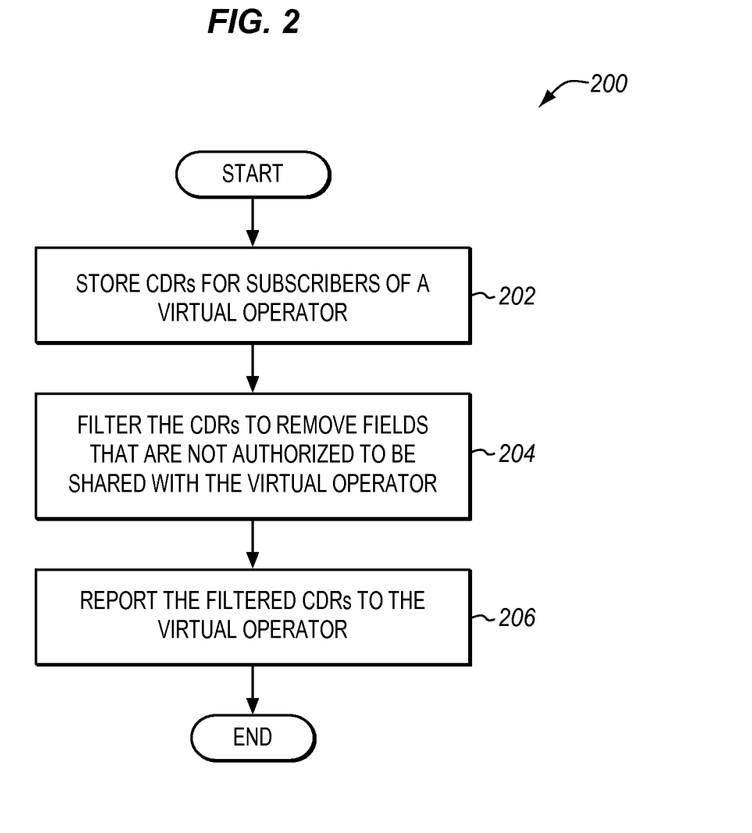
FIG. 2 is a flow chart illustrating a method of sharing CDRs with a virtual operator in an exemplary embodiment.

FIG. 2 is a flow chart illustrating a method 200 of sharing CDRs with virtual operator 120 in an exemplary embodiment. The steps of method 200 will be described with reference to reporting entity 114 in FIG. 1, but those skilled in the art will appreciate that method 200 may be performed in other systems. Also, the steps of the flow chart in FIG. 2 are not all inclusive and may include other steps not shown, and the steps may be performed in an alternative order.

Assume for this embodiment that subscribers of virtual operator 120 access services provided by communication network 101, and that charging entity 112 generates CDRs detailing the network resource usage of the subscribers. Charging entity 112 sends the CDRs for the subscribers of virtual operator 120 to reporting entity 114, where CDR database 115 stores the CDRs (step 202). CDR database 115 may store many different types of CDRs for the subscribers of virtual operator 120. The CDRs may be per-service, per-subscriber, per-subscriber per-network element 110, etc., or may be correlated for multiple services, multiple network elements 110, etc.

Based on an agreement between network operator 105 and virtual operator 120, network operator 105 may provide CDR information to virtual operator 120 regarding the subscribers of virtual operator 120. Reporting system 114 may be programmed to periodically report CDR information to virtual operator 120 indicating the network resource usage of its subscribers, such as at the end of a billing cycle. Reporting system 114 may also receive a request (i.e., a fetch request) from virtual operator 120, and report the CDR information to virtual operator 120 in response to the request.

Before reporting CDR information to virtual operator 120, filtering node 117 is configured to filter certain fields from the CDRs that are not authorized for virtual operator 120. It is assumed at this point that network operator 105 has defined rules/criteria indicating what CDR fields are authorized for virtual operator 120. Filtering node 117 accesses the CDRs stored in CDR database 115, and filters the CDRs to remove fields from the CDRs that are not authorized to be shared with virtual operator 120 (step 204). This process generates "filtered" CDRs that include a subset of CDRs fields determined to be authorized for virtual operator 120, while unauthorized fields have been removed. When filtering node 117 removes a CDR field, it may remove all data regarding the field (e.g., header and values/variable) or may remove the values/variables associated with the field. After generating the filtered CDRs for virtual operator 120, filtering node 117 reports the filtered CDRs to virtual operator 120 (step 206). For example, filtering node 117 may send the filtered CDRs to a CDR database 122 for virtual operator 120 (see FIG. 1).

After receiving the filtered CDRs from reporting entity 114, virtual operator 120 may process the information in the filtered CDRs to handle charging/billing issues regarding its subscribers. Because virtual operator 120 may receive more information in the filtered CDRs than in a typical batch file, virtual operator 120 may be able to handle the charging/billing issues more effectively. At the same time, network operator 105 is able to control how much CDR information is provided to virtual operator 120 so that network operator 105 does not reveal more information than is desired.

Figure 3:
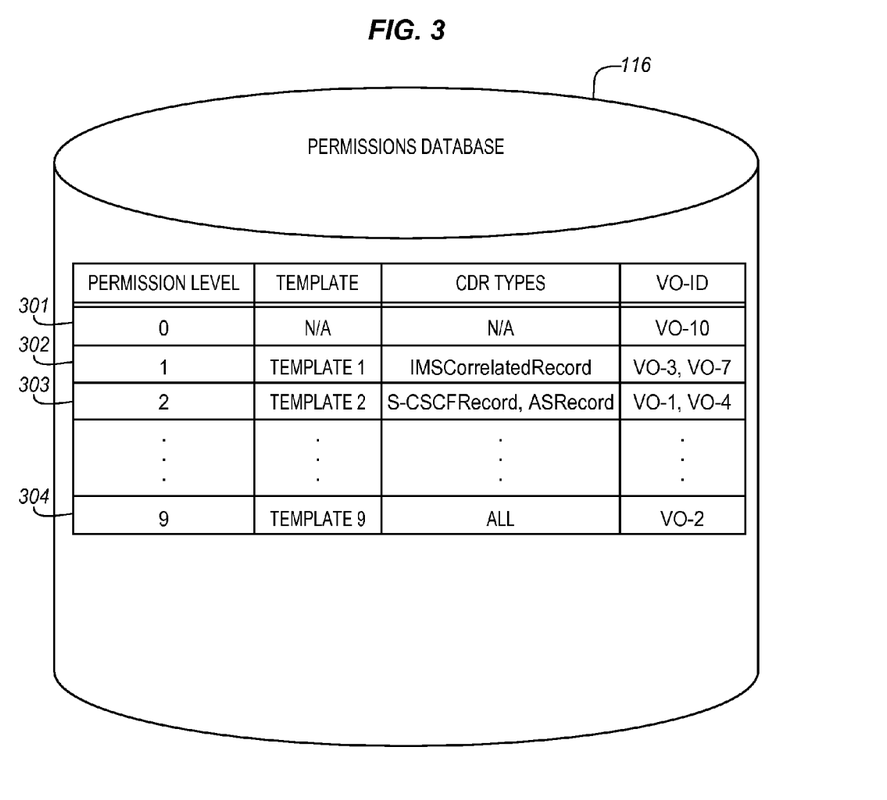
FIG. 3 illustrates data stored within a permissions database in an exemplary embodiment.

To filter the CDRs as in method 200, permissions database 116 may store criteria or rules for filtering CDRs based on the permissions of virtual operator 120. FIG. 3 illustrates data stored within permissions database 116 in an exemplary embodiment. Permissions database 116 stores a plurality of data entries 301-304. Each entry includes a permission level, a template (or template ID) associated with the permission level, an indication of authorized CDR types associated with the permission level, and one or more virtual operator identifiers (VO-ID) assigned to the permission level. The permission level of an entry represents an amount of trust a network operator has with a virtual operator, and consequently how much CDR information the network operator is willing to share with the virtual operator. The higher the permission level in FIG. 3, the more CDR information the virtual operator is authorized to receive from reporting entity 114. For example, if a virtual operator is not known or trusted by a network operator, then that virtual operator may be assigned a permission level of zero (0), which means they are not authorized to receive any CDR information. If a virtual operator is known and trusted by a network operator (e.g., a long standing relationship), then that virtual operator may be assigned a permission level of nine (9) in this example. Virtual operators at this level are allowed to get detailed views of the CDRs that pertain to its subscribers. Between the lowest and the highest permission levels, a network operator is able to define multiple levels that allow gradually increasing levels of detail to be visible to the virtual operator. The permission levels and the corresponding permissions are administered by the network operators, and may be based on agreements or negotiations with the virtual operators.

The template associated with each permission level indicates CDR fields that are authorized to be shared with a virtual operator at this permission level. For example, the template (template 1) associated with permission level "1" may indicate that a Calling-Party-Address field, a Called-Party-Address field, a Start-Timestamp field, and a Stop-Timestamp field are authorized to be shared with a virtual operator (all other fields are not authorized). The template (template 9) associated with permission level "9" may indicate that all fields are authorized to be shared with a virtual operator. Permission level zero (0) is an unauthorized level meaning that a virtual operator is not authorized to receive CDR information, so no template is defined for this level. Virtual operators having a permission level of "0" would only get batch files as is conventionally done. The templates are configurable by the network operator depending on what CDR information they want to share with a virtual operator.

The "CDR types" associated with each permission level indicates types of CDRs that are authorized to be shared with a virtual operator at this permission level. For example, the CDR type associated with permission level "1" may indicate that only an "IMS CorrelatedRecord" is authorized to be shared with a virtual operator. The CDR type associated with permission level "9" may indicate that all types of CDRs are authorized to be shared with a virtual operator.

The VO-ID indicates the virtual operators assigned to each permission level. For example, the virtual operator having an ID of "VO-10" is assigned to permission level "0", the virtual operators having IDs of "VO-3" and "VO-7", respectively, are assigned to permission level "1", etc.

Figure 4:
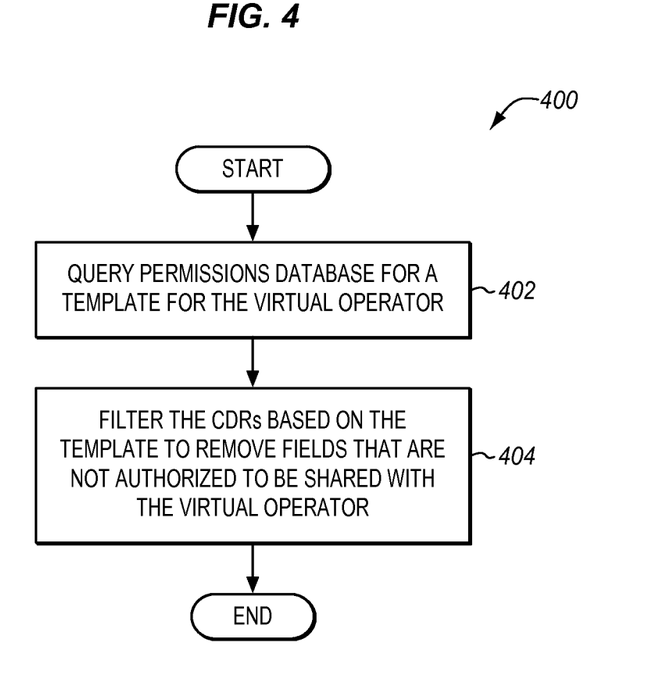
FIG. 4 is a flow chart illustrating a method of filtering CDRs based on a template in an exemplary embodiment.

With permissions database 116 populated with entries 301-304 as shown in FIG. 3, filtering node 117 may operate as described in FIG. 4 to filter CDRs. FIG. 4 is a flow chart illustrating a method 400 of filtering CDRs based on a template in an exemplary embodiment. In step 402, filtering node 117 sends a query to permissions database 116 for a template pertaining to virtual operator 120. The query may include an ID for virtual operator 120. Permissions database 116 may then use the ID for virtual operator 120 to identify an entry/permission level for virtual operator 120. Permissions database 116 then sends a response to filtering node 117 with the template for the applicable permission level of virtual operator 120. Permissions database 116 may also send an indication of the CDR types for the applicable permission level of virtual operator 120. In step 404, filtering node 117 filters the CDRs for the subscribers of virtual operator 120 based on the template provided by permissions database 116. Filtering node 117 may also filter the CDRs for the subscribers of virtual operator 120 based on the authorized CDR types defined for the permission level of virtual operator 120.

Assume for example that virtual operator 120 is authorized to receive an "IMSCorrelatedRecord". The following illustrates the fields of an IMSCorrelatedRecord:

```
IMSCorrelatedRecord ::= SET
{
    recordType
    sIP-Method
    role-of-Node
    list-Of-Node-Information
    session-Id
    list-Of-Calling-Party-Address
    called-Party-Address
    privateUserID
    serviceRequestTimeStamp
    serviceDeliveryStartTimeStamp
    serviceDeliveryEndTimeStamp
    recordOpeningTime
    recordClosureTime
    interOperatorIdentifiers
    localRecordSequenceNumber
    iMS-Charging-Identifier
    list-Of-SDP-Media-Components
    gGSNaddress
    list-Of-Message-Bodies
    recordExtensions
    expiresInformation
    list-Of-Associated-URI
    event
    accessNetworkInformation
    serviceContextID
    list-of-subscription-ID
    list-Of-Early-SDP-Media-Components
    iMSCommunicationServiceIdentifier
    numberPortabilityRouting
    carrierSelectRouting
    serviceSpecificInfo
    applicationServersInformation
    requested-Party-Address
    list-Of-Called-Asserted-Identity
    alternateChargedPartyAddress
}
```

Depending on the permission level of virtual operator 120, filtering node 117 is able to remove one or more fields of this CDR based on the applicable template before sending a filtered version of the CDR to virtual operator 120.

Figure 5:
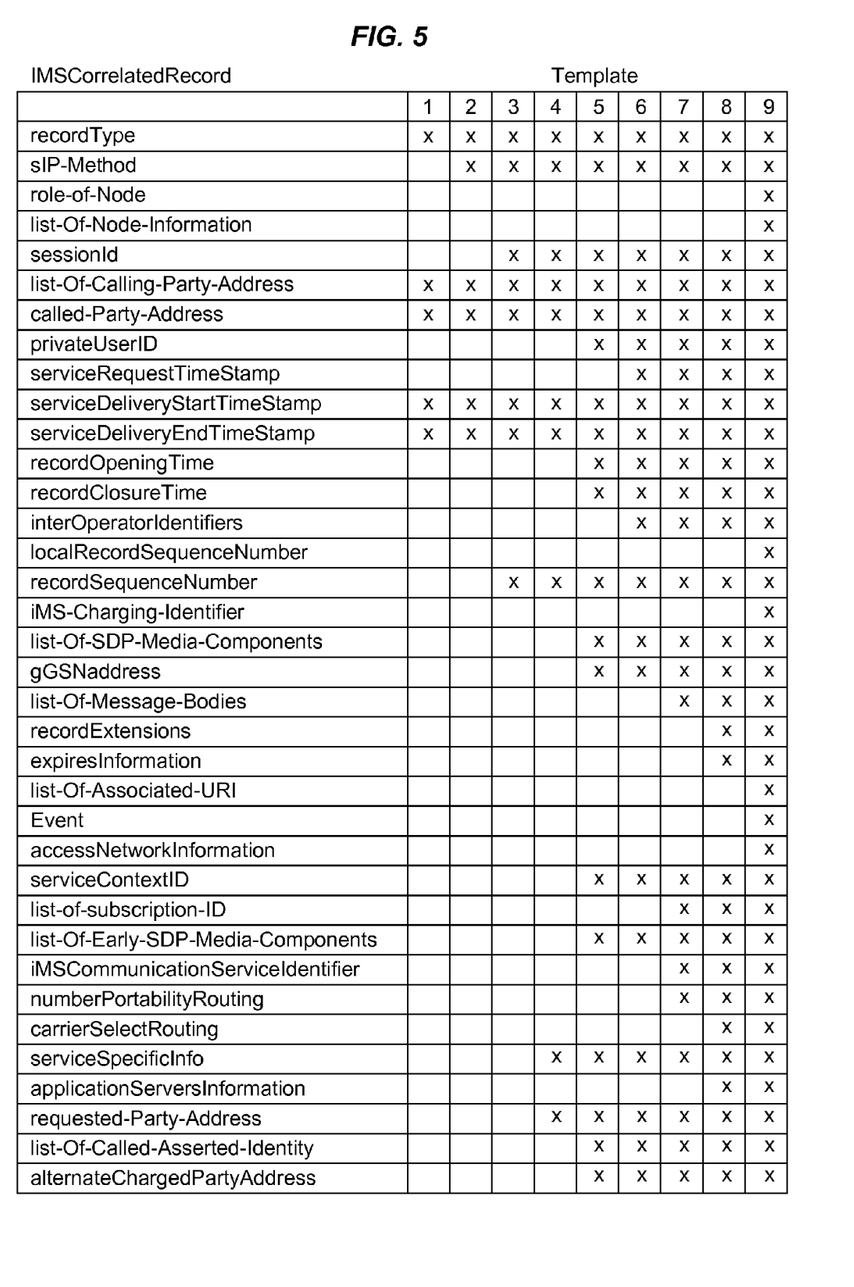
FIG. 5 illustrates templates for filtering an IMSCorrelatedRecord in an exemplary embodiment.

FIG. 5 illustrates templates for filtering an IMSCorrelatedRecord in an exemplary embodiment. The left-hand column of FIG. 5 illustrates the CDR fields for an IMSCorrelatedRecord. The right-hand columns in FIG. 5 indicate templates 1-9, where an "x" indicates that a CDR field is authorized for that template. If, for example, virtual operator 120 has a permission level of "1", then filtering node 117 will use template 1 to filter the IMSCorrelatedRecord CDR. Template 1 indicates that the "recordType" field, the "list-Of-Calling-Party-Address" field, the "called-Party-Address" field, the "serviceDeliveryStartTimeStamp" field, and the "serviceDeliveryEndTimeStamp" field are authorized to be shared. The other CDR fields are not authorized to be shared at permission level "1", so filtering node 117 removes the other fields from the CDR before sending the CDR to virtual operator 120.

In another example, if virtual operator 120 has a permission level of "9", then filtering node 117 will use template 9 to filter the IMSCorrelatedRecord CDR. Template 9 indicates that all fields are authorized to be shared. Thus, filtering node 117 will not remove any fields from the CDR before sending the CDR to virtual operator 120. Filtering node 117 can use any of templates 1-9 to filter CDRs based on the permission level of virtual operator 120.

In addition to filtering fields from individual CDRs, filtering node 117 is able to filter types of CDRs from virtual operator 120. Charging entity 112 may generate individual CDRs per network element. For example, in an IP Multimedia Subsystem (IMS) network, charging entity 112 may generate a CDR for each of a Serving-Call Session Control Function (S-CSCF), an Application Server (AS), a Media-Gateway (MGW), etc., that serves a session. Filtering node 117 is able to filter the CDRs for the subscriber of virtual operator 120 to remove CDR types that are not authorized to be shared with the virtual operator 120 based on the permission level of virtual operator 120. Virtual operator 120 may be authorized to view fewer CDR types at a lower level of permission, and may be authorized to view more CDR types at higher levels of permission. The CDR types visible at a lower level of permission are visible at higher levels as well. For instance, if virtual operator 120 has a permission level of "1" (see FIG. 3), then it is authorized to receive an "IMSCorrelatedRecord". Thus, filtering node 117 will remove all other CDR types, and only report the IMSCorrelatedRecord to virtual operator 120. Filtering node 117 will also filter the fields of the IMSCorrelatedRecord as described above based on the template for permission level "1". If virtual operator 120 has a permission level of "2", then it is authorized to receive an "S-CSCFRecord" and an "ASRecord" along with an "IMSCorrelatedRecord" (permission level "2" includes authorized CDRs types of lower permission levels). Thus, filtering node 117 will remove all other CDR types, and only report the S-CSCFRecord, the ASRecord, and the IMSCorrelatedRecord to virtual operator 120. Filtering node 117 will also filter the fields of these records based on the template for permission level "2".

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:
a reporting entity of a communication network that provides services to subscribers of a virtual operator, the reporting entity comprising:
 a Charging Data Record (CDR) database configured to store CDRs for the subscribers of the virtual operator;
 a permissions database configured to store a plurality of data entries, where each of the data entries includes a permission level, and a template indicating CDR fields that are authorized to be shared at the permission level; and
 a filtering node including a hardware processor configured to query the permissions database to retrieve one of the templates corresponding with the permission level of the virtual operator, to filter the CDRs based on the template to remove fields that are not authorized to be shared with the virtual operator, and to report the filtered CDRs to the virtual operator.

2. The apparatus of claim 1 wherein:
the permissions database is configured to store, in each of the data entries, an indicator of CDR types that are authorized to be shared.

3. The apparatus of claim 2 wherein:
the filtering node is configured to filter the CDRs to remove the CDR types that are not authorized to be shared with the virtual operator.

4. The apparatus of claim 1 wherein:
the filtering node is configured to push the filtered CDRs to the virtual operator at the end of a billing cycle.

5. The apparatus of claim 1 wherein:
the filtering node is configured to receive a fetch request from the virtual operator, and to report the filtered CDRs to the virtual operator in response to the fetch request.

6. The apparatus of claim 1 wherein:
the virtual operator comprises a Network Unaffiliated Virtual Operator (NUVO).

7. A method comprising:
storing Charging Data Records (CDRs) for services provided through a communication network to subscribers of a virtual operator;
storing a plurality of data entries, where each of the data entries includes a permission level, and a template indicating CDR fields that are authorized to be shared at the permission level;
retrieving one of the templates corresponding with the permission level of the virtual operator;
filtering the CDRs based on the template to remove fields that are not authorized to be shared with the virtual operator; and
reporting the filtered CDRs to the virtual operator.

8. The method of claim 7 further comprising:
storing, in each of the data entries, an indicator of CDR types that are authorized to be shared.

9. The method of claim 8 further comprising:
filtering the CDRs to remove the CDR types that are not authorized to be shared with the virtual operator.

10. The apparatus of claim 7 wherein:
the virtual operator comprises a Network Unaffiliated Virtual Operator (NUVO).

11. A non-transitory computer readable medium that stores program instructions for a reporting entity of a communication network that provides services to subscribers of a virtual operator, where the program instructions when executed by a computer system, instruct the computer system to:
 store Charging Data Records (CDRs) for the subscribers of the virtual operator;
 store a plurality of data entries, where each of the data entries includes a permission level, and a template indicating CDR fields that are authorized to be shared at the permission level;
 retrieve one of the templates corresponding with the permission level of the virtual operator;
 filter the CDRs based on the template to remove fields that are not authorized to be shared with the virtual operator; and
 report the filtered CDRs to the virtual operator.

12. The computer readable medium of claim 11 wherein the program instructions instruct the computer system to:
 store, in each of the data entries, an indicator of CDR types that are authorized to be shared.

13. The computer readable medium of claim 12 wherein the program instructions instruct the computer system to:
 filter the CDRs to remove the CDR types that are not authorized to be shared with the virtual operator.

14. The computer readable medium of claim 11 wherein:
the virtual operator comprises a Network Unaffiliated Virtual Operator (NUVO).

* * * * *